(12) United States Patent
Kochie et al.

(10) Patent No.: US 11,834,013 B2
(45) Date of Patent: Dec. 5, 2023

(54) JACK STAND WITH GEARING ADJUSTMENT

(71) Applicant: Robert Bosch GmbH, Stuttgart (DE)

(72) Inventors: Robert Kochie, Dodge Center, MN (US); Robert Jensen, Clarks Grove, MN (US)

(73) Assignees: Bosch Automotive Service Solutions Inc., Warren, MI (US); Robert Bosch GmbH, Stuttgart (DE)

( * ) Notice: Subject to any disclaimer, the term of this patent is extended or adjusted under 35 U.S.C. 154(b) by 454 days.

(21) Appl. No.: 17/171,693

(22) Filed: Feb. 9, 2021

(65) Prior Publication Data

US 2021/0284105 A1    Sep. 16, 2021

Related U.S. Application Data

(60) Provisional application No. 62/990,121, filed on Mar. 16, 2020.

(51) Int. Cl.
*B60S 9/04* (2006.01)
*F16H 19/04* (2006.01)
*B66F 3/02* (2006.01)
*B66F 13/00* (2006.01)
*B66F 1/06* (2006.01)

(52) U.S. Cl.
CPC ............... *B60S 9/04* (2013.01); *B66F 1/06* (2013.01); *B66F 3/02* (2013.01); *B66F 13/00* (2013.01); *F16H 19/04* (2013.01)

(58) Field of Classification Search
CPC ...... B60S 9/04; B66F 1/06; B66F 3/02; B66F 13/00; F16H 19/04
See application file for complete search history.

(56) References Cited

U.S. PATENT DOCUMENTS

| | | | | |
|---|---|---|---|---|
| 3,599,923 A | * | 8/1971 | Hunnicutt | B60S 5/00 248/352 |
| 4,848,735 A | * | 7/1989 | Pittman | B60S 9/04 254/420 |
| 5,180,131 A | * | 1/1993 | Few | F16M 11/18 254/108 |
| 7,878,482 B2 | * | 2/2011 | Hernandez, Jr. | B66F 3/30 254/93 H |
| 8,807,506 B2 | * | 8/2014 | Hanlon | B66F 1/06 248/354.4 |
| 9,988,021 B1 | * | 6/2018 | Young | B60S 9/04 |

FOREIGN PATENT DOCUMENTS

| | | |
|---|---|---|
| DE | 1606476 | 10/1946 |
| DE | 1600320 | 2/1950 |
| DE | 1064224 | 10/1953 |
| DE | 1933572 | 7/1969 |

* cited by examiner

*Primary Examiner* — Anita M King
(74) *Attorney, Agent, or Firm* — David Kovacek; Maginot, Moore & Beck LLP

(57) ABSTRACT

A jack stand having a rack-and-pinion gearing mechanism to extend a support member. The jack stand further comprises a latching mechanism suitable to provide a static force operable to sustain elevation of a vehicle. The jack stand further comprises a number of sleeves configured to receive a detachable handle operable to utilize the functions of the jack stand from a distance away from the underside of the vehicle.

15 Claims, 4 Drawing Sheets

JACK STAND WITH GEARING ADJUSTMENT

TECHNICAL FIELD

This disclosure relates to automotive shop tools, and more specifically automotive jack stands suitable for suspending a vehicle in an elevated or partially-elevated position.

BACKGROUND

Jack stands are utilized to provide static support to a vehicle frame in an elevated position, after being raised using a dynamic actuator. Jack stands may be placed after part of the chassis of a vehicle has been elevated by a jack. A standard jack stand requires the user to slide the jack stand into position manually, then adjust the height of the stand. Typically this requires the user to place part or all of their body underneath the elevated vehicle while the vehicle is elevated up by a service jack. Additionally, the ergonomics of placement and adjustment are sub-optimal because the user may need to crawl on the floor or ground to facilitate placement and adjustment. It would be advantageous for a user to be able to place and adjust the jack stand from an ergonomic position, and it would maximize the safety of the user if no part of their body would need to be placed under the elevated vehicle during placement and adjustment of the jack stand.

SUMMARY

One aspect of this disclosure is directed to a jack stand comprising a base comprising a first end and a second end, wherein the first end forms a collar and the second end is configured to rest upon a supporting surface during deployment of the jack stand. The jack stand may further comprise a support member having a brace surface, the support member being at least partially disposed through the collar and comprising a first set of gear teeth. The jack stand may further comprise a rack-and-pinion gearing having a second set of gear teeth, the rack-and-pinion gearing operable to adjust an extension of the brace surface away from the base in a direction transverse to the supporting surface and the collar within a specified tolerance. The jack stand may further comprise a first actuator coupled to a pinion gear of the rack-and-pinion gearing and comprising a first sleeve, the first actuator operable to provide a rotational drive force to the pinion gear. The jack stand may further comprise a latch operable to engage the teeth of the first set of gear teeth, the latch configured to fix the extension of the brace surface when engaged. The jack stand may further comprise a second actuator coupled to the latch and comprising a second sleeve, the second actuator operable to disengage the latch. The jack stand may also comprise a handle configured to be received by the first sleeve and second sleeve, the handle configured to drive the first actuator when received by the first sleeve and drive the second actuator when received by the second sleeve. In some embodiments, the rack-and-pinion gearing may be at least partially disposed within an internal cavity defined by the base.

A further aspect of this disclosure may be directed to an embodiment of the handle that may comprise a release, the release operable to disengage the handle from the interior of the first sleeve when received by the first sleeve and further operable to disengage the handle from the interior of the second sleeve when received by the second sleeve.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
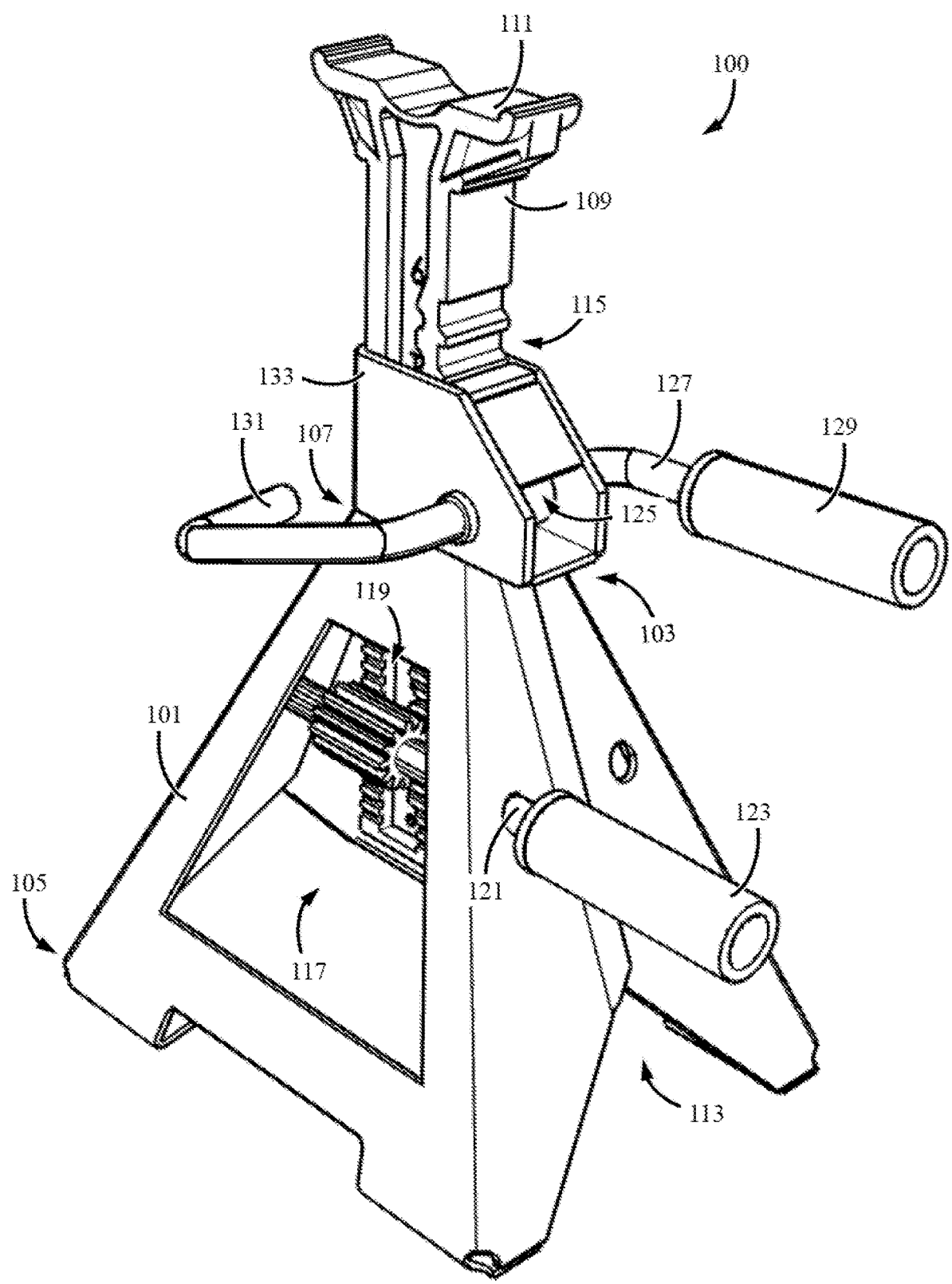
FIG. 1 is a view of a jack stand.

FIG. 1 shows a jack stand 100 according to one embodiment of the invention disclosed herein. Jack stand 100 comprises a base 101 having a first end 103 and a second end 105. The second end 105 is configured to rest on a supporting surface, such as the ground or a flooring, during deployment of jack stand 100. In some embodiments, base 101 may be configurable to adapt to uneven supporting surfaces without deviating from the teachings disclosed herein. When jack stand 100 is supported by a supporting surface, base 101 extends away from the supporting surface. The first end 103 may define a collar 107 through which a support member 109 may extend. Support member 109 comprises a brace surface 111 configured to engage with the chassis of a vehicle and provide direct support to a vehicle.

Base 101 defines an internal cavity 113, into which the support member 109 may extend through the collar 107. In the depicted embodiment internal cavity 113 may be accessible via the underside of base 101, or via one or more windows defined within the exterior sides of base 101. Other embodiments may comprise different configurations of base 101 without deviating from the teachings disclosed herein.

Support member 109 may comprise a first set of gear teeth 115 disposed upon a surface thereof. Support member 109 may further be operable to engage with a rack-and-pinion gearing 117 via a second set of gear teeth 119. Rack-and-pinion gearing 117 may be configured to drive the first set of gear teeth 115. Actuating the rack-and-pinion gearing 117 may be operable to control the extension of support member 109 through collar 107. First set of gear teeth 115 and second set of gear teeth 119 may be disposed upon distinct surfaces of support member 109. In the depicted embodiment, the first set of gear teeth 115 is disposed upon a surface that is transverse to the surface upon which the second set of gear teeth 119 is disposed. In the depicted embodiment, the transverse placement of the surfaces are disposed at a perpendicular angle, but in some embodiments the surfaces may be transverse to within a specified tolerance without deviating from the teachings disclosed herein. In some embodiments, the respective surfaces upon which first set of gear teeth 115 and second set of gear teeth 119 are disposed upon may be arranged at a different angle without deviating from the teachings disclosed herein. In some embodiments, the first set of gear teeth 115 and the second set of gear teeth 119 may be disposed upon the same surface of support member 109 without deviating from the teachings disclosed herein. In the depicted embodiment, first set of gear teeth 115 and second set of gear teeth 119 have different gear configurations, but other embodiments may comprise mutually-compatible gear configurations without deviating from the teachings disclosed herein.

The rack-and-pinion gearing 117 may be actuated via a first actuator 121. In the depicted embodiment, first actuator 121 may be axially-coupled to rack-and-pinion gearing 117, and actuated by applying a rotational drive force to the gearing. Other embodiments may comprise other configurations without deviating from the teachings disclosed herein. The rotational drive force engages the rack-and-pinion gearing 117, adjusting the extension of support member 109 through collar 107 in a direction away from base 101.

First actuator 121 may comprise a first sleeve 123 operable to receive a handle. The handle may be utilized to ergonomically operate the first actuator 121 such that the user does not need to descend to the supporting surface.

First actuator 121 may be operable to extend the support member 109, but jack stand 100 may comprise a latch 125 that is operable to restrict the retraction of support member 109. Restricting the retraction advantageously improves safety of jack stand 100 by improving stability of support when the jack stand is used to maintain an elevated position of a vehicle. In the depicted embodiment, latch 125 may be operable to restrict the retraction of support member 109, but not the extension. Other embodiments may comprise other configurations of restriction without deviating from the teachings disclosed herein. Restriction of motion only with respect to retraction advantageously permits the user to freely extend jack stand 100 from a safe distance and using an ergonomic body position without additional assistance from a second user.

Latch 125 may engage automatically, and may be disengaged using a second actuator 127. Second actuator 127 may comprise a momentary switch, and my re-engage automatically. This configuration may advantageously permit the retraction of support member 109 via utilization of gravity in a safe way, even if the support member is still under load. Other embodiments may comprise other configurations without deviating from the teachings disclosed herein. In the depicted embodiment, latch 125 may be disengaged momentarily by utilizing a pumping force applied to second actuator 127, but other embodiments may comprise other configurations without deviating from the teachings disclosed herein.

Second actuator 127 may comprise a second sleeve 129 configured to receive a handle. The handle may be utilized to ergonomically operate the second actuator 121 such that the user does not need to descend to the supporting surface. In the depicted embodiment, first sleeve 123 and second sleeve 129 may comprise identical dimensions having matching measurements, such that they may receive the same detachable handle. In some embodiments, first sleeve 123 and second sleeve 129 may comprise distinct but similar dimensions, such that they may respectively each receive the same or different detachable handles without deviating from the teachings disclosed herein. In some embodiments, first sleeve 123 and second sleeve 129 may comprise distinct dimensions requiring distinct handles without deviating from the teachings disclosed herein. In the depicted embodiment, first sleeve 123 and second sleeve 129 are oriented in the same direction to within a specified tolerance. This shared orientation may advantageously permit a single user to operate the respective functions of jack stand 100 without having to adjust position with respect to the jack stand. Other embodiments may comprise different configurations having different orientations without deviating from the teachings disclosed herein.

In the depicted embodiment, a proximal handle 131 may also be coupled to second actuator 127. Proximal handle 131 may be operable to operate second actuator 127 in the event that a detachable handle compatible with sleeve 129 is unavailable. In some embodiments, proximal handle 131 may be locked in a position disengaging latch 125, defeating the re-engagement of latch 125. To improve safety conditions for the user and protect the components of latch 125 and first set of gear teeth 115, latch 125 may be disposed within a latch housing 133. Some embodiments may not comprise a latch housing 133 without deviating from the teachings disclosed herein.

Figure 2:
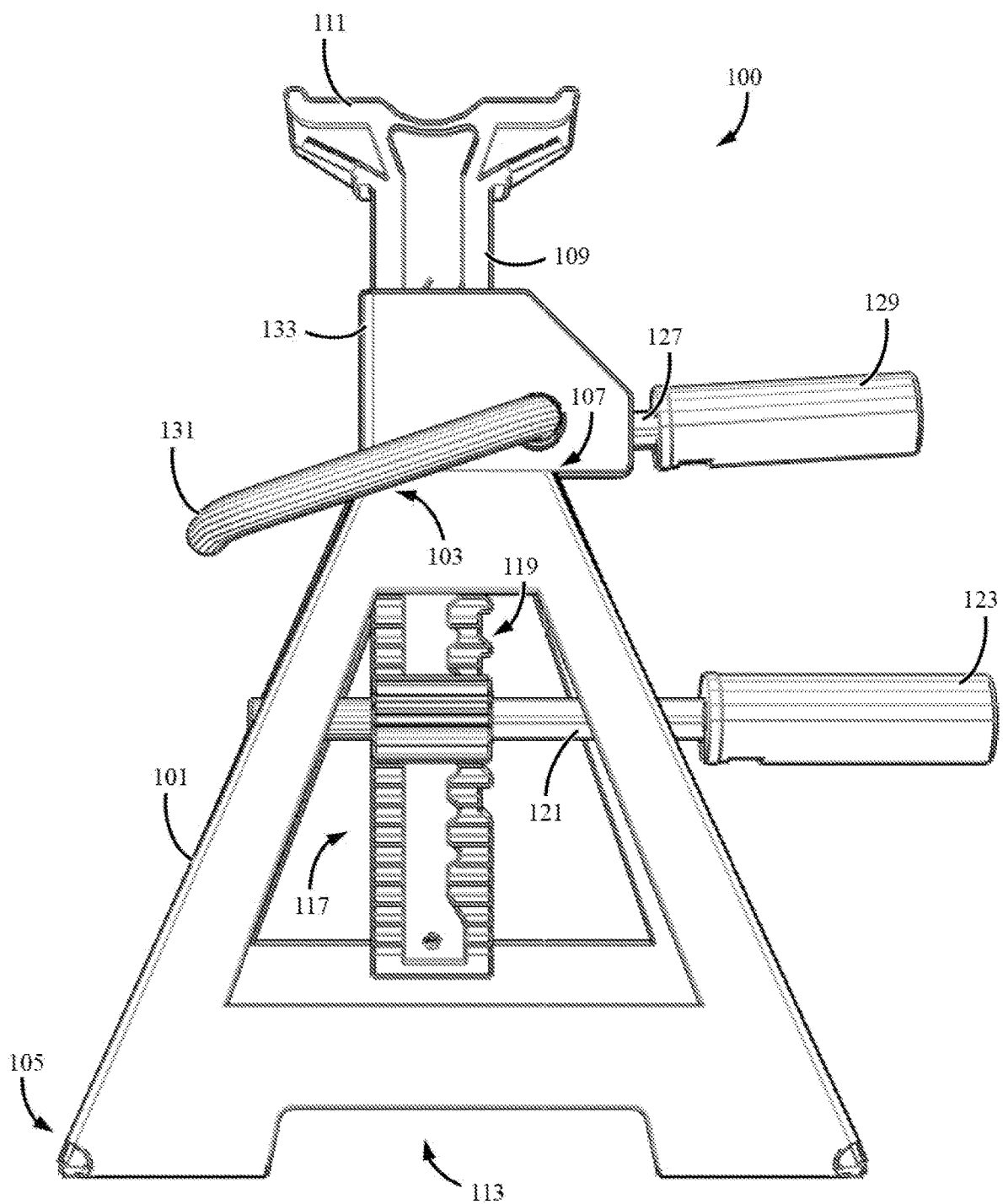
FIG. 2 is side view of a jack stand.

FIG. 2 comprises a side view of jack stand 100, providing a closer view of rack-and-pinion gearing 117, through a window of base 101.

Figure 3:
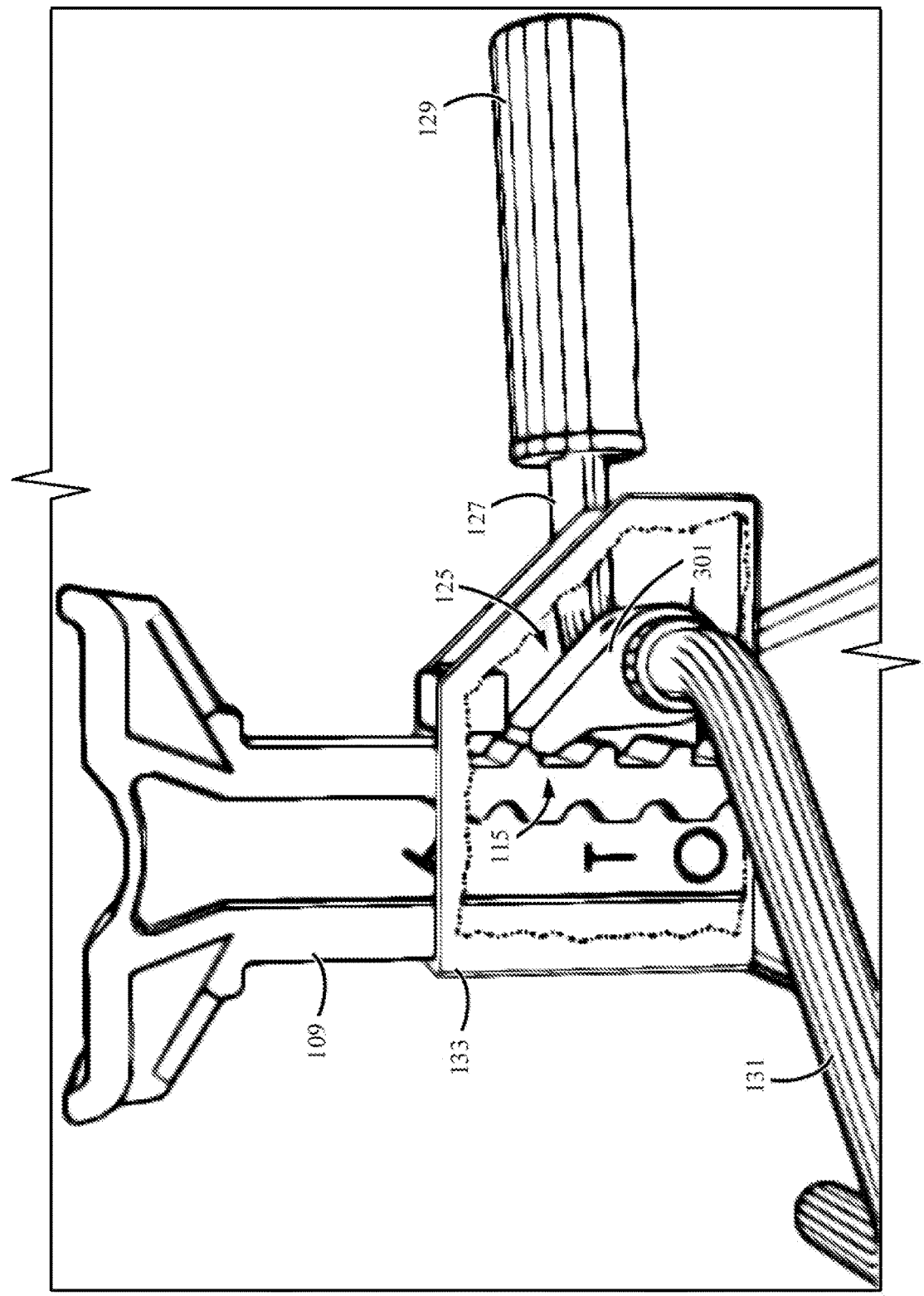
FIG. 3 is an interior view of a latch housing of a jack stand.

FIG. 3 provides a view of the interior of latch housing 133, showing the interaction of latch 125 with the first set of gear teeth 115. Latch 125 utilizes a tooth lock 301 configured to engage a tooth of the first set of gear teeth 115. The tooth lock 301 may be configured with respect to second actuator 127 to receive a locking force, the locking force rotating tooth lock 301 toward the first set of gear teeth 115. In this manner, the locking force may cause an automatic engagement of latch 125 with the first set of gear teeth 115. In the depicted embodiment, the locking force may be provided using a spring assembly, tension mechanism, or any other mechanism known to one of ordinary skill in the art without deviating from the teachings disclosed herein. In the depicted embodiment, the locking force is sufficient to re-engage tooth lock 301 after one of the first set of gear teeth 115 has passed beyond the tooth lock 301. With repeated disengagement and re-engagement, a vehicle can be lowered from an elevated position in a controlled and safe manner. In the depicted embodiment, tooth lock 301 may be operable to sustain forces suitable to suspend a vehicle in an elevated position when latch 125 is engaged. In some embodiments, tooth lock 301 may be operable to sustain lesser forces without deviating from the teachings disclosed herein.

Figure 4:
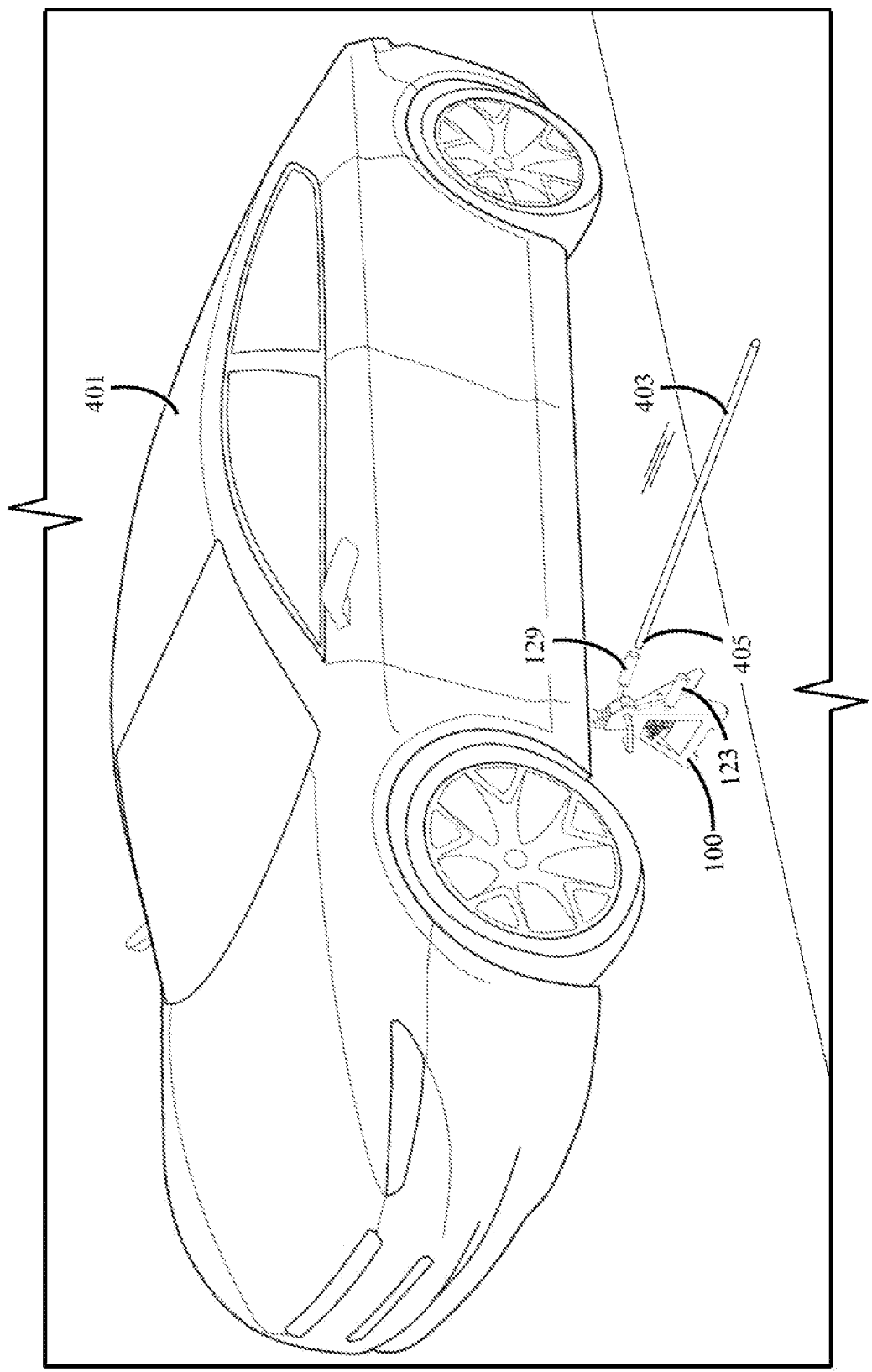
FIG. 4 is an illustration of a jack stand during utilization with a vehicle.

FIG. 4 depicts jack stand 100 during operation of elevating a vehicle 401 away from a supporting surface such as the ground. In the depicted embodiment, jack stand 100 may be operable using a detachable handle 403, which is compatible to be received by a first sleeve 123 and second sleeve 129 (see FIG. 1) of jack stand 100. Utilizing detachable handle 403, jack stand 100 may be positioned under vehicle 401 while a jack (not shown) has already elevated the vehicle. While the vehicle is elevated by the jack, the support member 109 (see FIG. 1) of jack stand 100 may be extended utilizing detachable handle 403. Because jack stand 100 is configured to lock its supporting member into a particular extension automatically, the jack stand 100 provides a static support to elevate vehicle 401. After jack stand 100 has engaged with the chassis of vehicle 401, the jack can be removed and utilized elsewhere. When service on vehicle 401 is completed, detachable handle 403 may be utilized to disengage the latch 125 (see FIG. 1) of jack stand 100. Because the latch 125 is configured to re-engage (see FIG. 3), vehicle 401 may be lowered in a controlled and safe manner. Because jack stand 100 is operated using detachable handle 403, a user may be safely away from the underside of vehicle 401 at all times when the jack stand 100 is being operated. In the depicted embodiment, detachable handle 403 may comprise an extended handle. Some embodiments may comprise a detachable handle having a total length of 2 feet or greater without deviating from the teachings disclosed herein. In some embodiments, detachable handle 403 may comprise a different shape without deviating from the teachings disclosed herein, such as a rotational handle suitable to improve efficiency of axial rotation of rack-and-pinion gearing 117 via first actuator 121 (see FIG. 1).

Handle 403 may be configured to engage the interior of first sleeve 123 and second sleeve 129. In the depicted embodiment, handle 403 terminates in a driver bit 405 suitable for rotational driving, such as a hex bit, a square bit, or any other bit recognized by one of ordinary skill in the art. In the depicted embodiment, the interior dimensions of first sleeve 123 and second sleeve 129 may be configured to receive and engage the driver bit of handle 403. In some embodiments, the interior dimensions of first sleeve 123 and second sleeve 129 may be identical, but other embodiments may comprise distinct interior dimensions without deviating from the teachings disclosed herein. In some embodiments, handle 403 may comprise a ball detent design that forms a latching mechanism with the interior of one of the sleeves. The ball detent design may engage the interior or a receiving sleeve and snap into place, providing stable engagement between handle 403 and jack stand 100. In such embodiments, handle 403 may comprise a release for the ball detent, permitting handle 403 to be disengaged from the interior or a receiving sleeve. The release may be actuated by a user from the other end of handle 403, using an actuation mechanism such as a button. In such embodiments, the actuation mechanism may be disposed upon the end of handle 403 opposite the end received by a sleeve, but other embodiments may comprise other configurations having a different location of the actuation mechanism without deviating from the teachings disclosed herein. Other embodiments may comprise other configurations without deviating from the teachings disclosed herein.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A jack stand comprising:
    a base, the base comprising a first end and a second end, the first end forming a collar and the second end configured to rest upon a supporting surface during deployment of the jack stand;
    a support member having a brace surface, the support member being at least partially disposed through the collar and comprising a first set of gear teeth;
    a rack-and-pinion gearing having a second set of gear teeth, the rack-and-pinion gearing operable to adjust an extension of the brace surface away from the base in a direction transverse to the supporting surface and the collar within a specified tolerance;
    a first actuator coupled to a pinion gear of the rack-and-pinion gearing and comprising a first sleeve, the first actuator operable to provide a rotational drive force to the pinion gear;
    a latch operable to engage the teeth of the first set of gear teeth, the latch configured to fix the extension of the brace surface when engaged;
    a second actuator coupled to the latch and comprising a second sleeve, the second actuator operable to disengage the latch; and
    a handle configured to be received by the first sleeve and second sleeve, the handle configured to drive the first actuator when received by the first sleeve and drive the second actuator when received by the second sleeve.

2. The jack stand of claim 1, wherein the base defines an internal cavity.

3. The jack stand of claim 2, wherein the rack-and-pinion gearing is at least partially disposed within the internal cavity.

4. The jack stand of claim 2, wherein the latch is disposed externally to the internal cavity.

5. The jack stand of claim 4, wherein the latch is disposed adjacent to the collar.

6. The jack stand of claim 1, wherein the second actuator further comprises a proximal handle, the proximal handle operable to disengage the latch.

7. The jack stand of claim 6, wherein the second actuator is operable to disengage the latch such that the latch re-engages automatically after one of the first set of teeth has passed through the collar.

8. The jack stand of claim 1, wherein the first sleeve and the second sleeve extend away from the base in substantially the same direction within a specified tolerance.

9. The jack stand of claim 1, wherein the first sleeve and the second sleeve comprise at least one dimension with a matching measurement within a specified tolerance.

10. The jack stand of claim 9, wherein the first sleeve and the second sleeve comprise matching measurements within respective specified tolerances.

11. The jack stand of claim 1, wherein the handle has a total length greater than 2 feet.

12. The jack stand of claim 1, wherein the second set of gear teeth is disposed at least in part upon a surface of the support member.

13. The jack stand of claim 12, wherein the first set of gear teeth and the second set of gear teeth are disposed upon distinct surfaces of the support member.

14. The jack stand of claim 13, wherein the first set of gear teeth is disposed upon a surface of the support member that is oriented transversely within a specified tolerance to the surface of the support member upon which the second set of gear teeth is disposed.

15. The jack stand of claim 1, wherein the handle comprises a driver configured to engage the interior of the first sleeve and the interior of the second sleeve.

* * * * *